United States Patent [19]

Rolston et al.

[11] 4,187,271

[45] Feb. 5, 1980

[54] METHOD OF MAKING SAME

[75] Inventors: J. Albert Rolston, Newark; Thomas E. Philipps, Granville, both of Ohio

[73] Assignee: Owens-Corning Fiberglas Corporation, Toledo, Ohio

[21] Appl. No.: 957,259

[22] Filed: Nov. 2, 1978

Related U.S. Application Data

[62] Division of Ser. No. 788,166, Apr. 18, 1977, abandoned.

[51] Int. Cl.² .................. B29D 3/02; B29D 23/00
[52] U.S. Cl. .................................. 264/258; 102/43 P; 264/137; 264/262; 264/263; 264/267; 264/269; 264/314; 264/318; 264/328
[58] Field of Search ............... 264/257, 258, 267, 269, 264/271, 274, 314, 318, 328, 137; 102/43 P

[56] References Cited

U.S. PATENT DOCUMENTS

| | | | |
|---|---|---|---|
| 2,564,695 | 8/1951 | Johnson et al. | 102/43 P |
| 2,837,456 | 6/1958 | Parilla | 102/43 P |
| 2,838,435 | 6/1958 | Hewett | 264/314 |
| 2,937,401 | 5/1960 | Amos | 264/314 |
| 3,258,384 | 6/1966 | Scott | 264/137 |
| 3,842,739 | 10/1974 | Scanlon et al. | 102/43 P |

*Primary Examiner*—W. E. Hoag
*Attorney, Agent, or Firm*—Ronald C. Hudgens; Philip R. Cloutier; Greg Dziegielewski

[57] ABSTRACT

Method of making a casing reinforced by a stretchable glass fiber preform is disclosed. The casing may be reinforced by metal or a glass fiber mat which is shaped to provide positive engagement with the stretchable fiber preform before its impregnation by a matrix-forming resin.

9 Claims, 9 Drawing Figures

METHOD OF MAKING SAME

This is a division of application Ser. No. 788,166, filed Apr. 18, 1977 now abandoned.

The present invention relates to a new and improved casing, and to a new and improved method of making casings.

In one of its more specific aspects this invention relates to a method of producing a novel cartridge casing and will be explained with reference thereto without meaning to limit the invention.

Casings, particularly cartridge casings, have traditionally been made of brass because it is a metal which can withstand the deep drawing operation involved in the commercial process of making the casings. In recent years, the cost of brass has increased significantly and so numerous attempts have been made to produce a plastic cartridge casing. To our knowledge, plastic cartridge has been limitedly successful because a high percentage of the cartridges break in the breech of the gun in which they are fired and the gun becomes jammed.

One type of breakage which occurs with plastic cartridges is a rupture at the extraction groove or rim. Attempts have been made to overcome this type of failure by using a three piece construction wherein one of the pieces is a metal head member containing the extraction groove. In such a construction, however, breakage of the plastic casing adjacent to the head member frequently occurs. The breakage can be caused by either a weakening of the plastic, or a weakening of the plastic bond with the metal head member. The weakening can be caused by heat, internal pressure, or inadequate confinement of the casing in the bore of the gun.

An object of the present invention is to provide a new and improved plastic casing having greater strength than have prior art cartridge casings due to a more uniform and reliable reinforcement of the plastic.

Another object of the present invention is to provide a new and improved design of a plastic cartridge casing which is adequately reinforced at the head or primer end of the casing.

Another object of the present invention is to provide a new and improved plastic cartridge casing containing a metal primer end reinforcement containing an extraction groove having a design which more adequately prevents separation of the metal primer end from the remainder of the plastic case.

A further object of the present invention is the provision of a new and improved method of producing a cartridge casing.

These and other objects of the invention are accomplished by a method of making shell casings in which a fibrous preform is introduced into first end of an expandable sleeve and a tubular memeber is introduced into the second, opposite end of the sleeve. The expandable member and fibrous sleeve are expanded within a mold and a hardenable resin is introduced into the mold between the expandable member and the inner wall of the mold to wet out the tubular member. The resin is then hardened to form the casing.

Figures 1, 2:
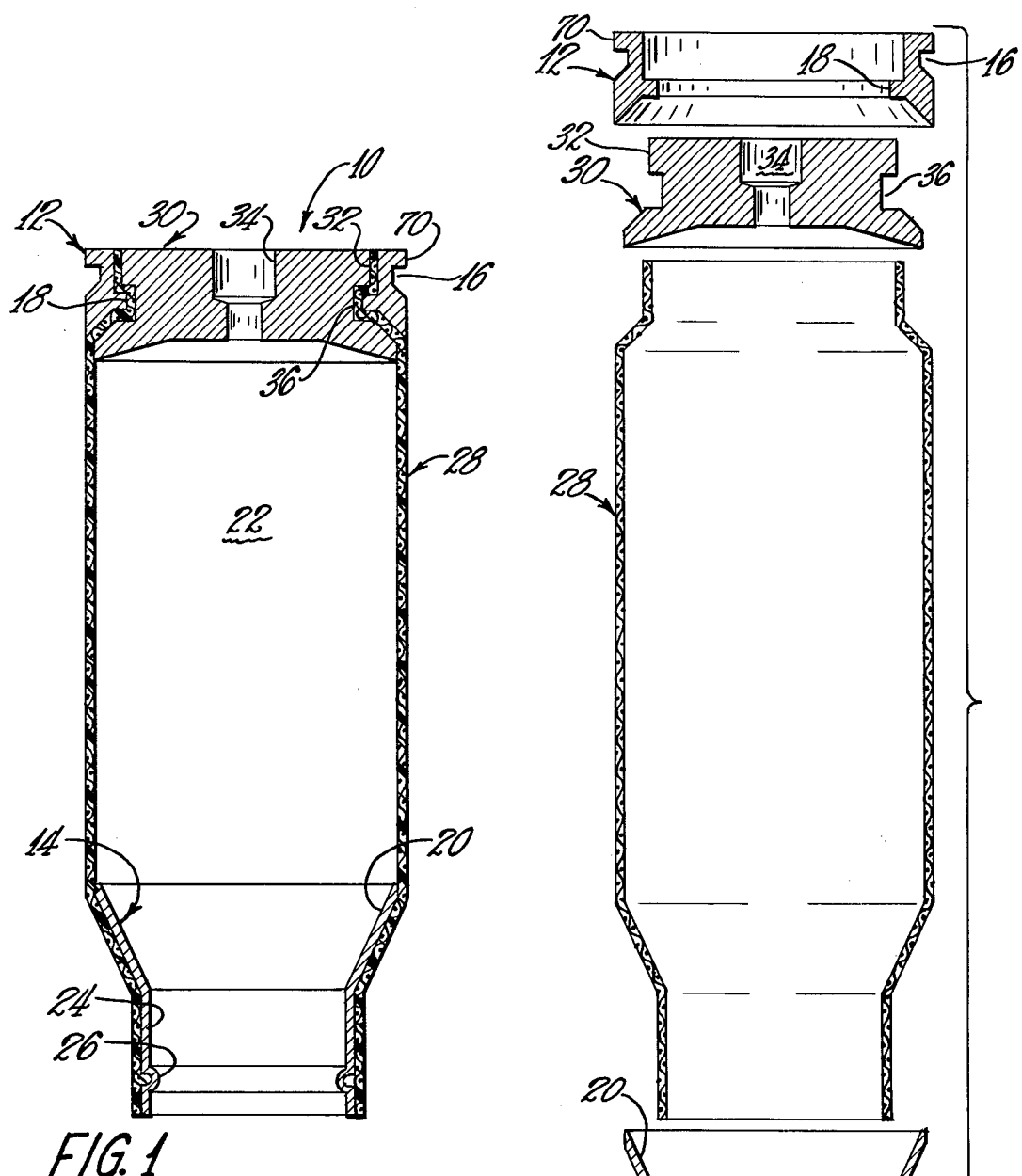
FIG. 1 is a cross-sectional view of an embodiment of the present invention wherein the primer end and the projectile end of the casing are reinforced with metal.
FIG. 2 is an exploded view of the elements which go to make up the embodiment shown in FIG. 1.
Figure 3:
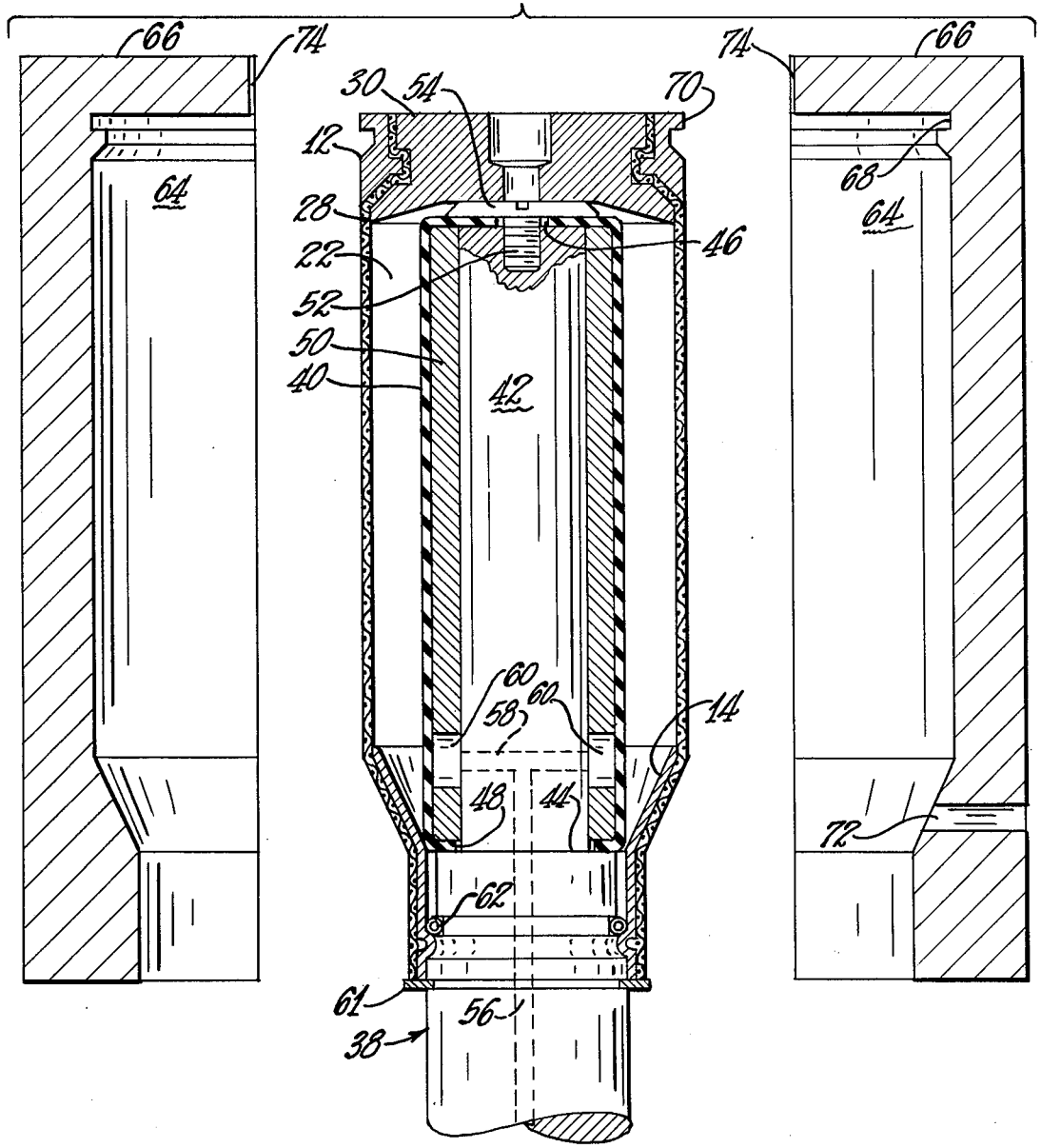
FIG. 3 is a sectional view of apparatus used to mold the cartridge case shown in FIG. 1.
Figure 4:
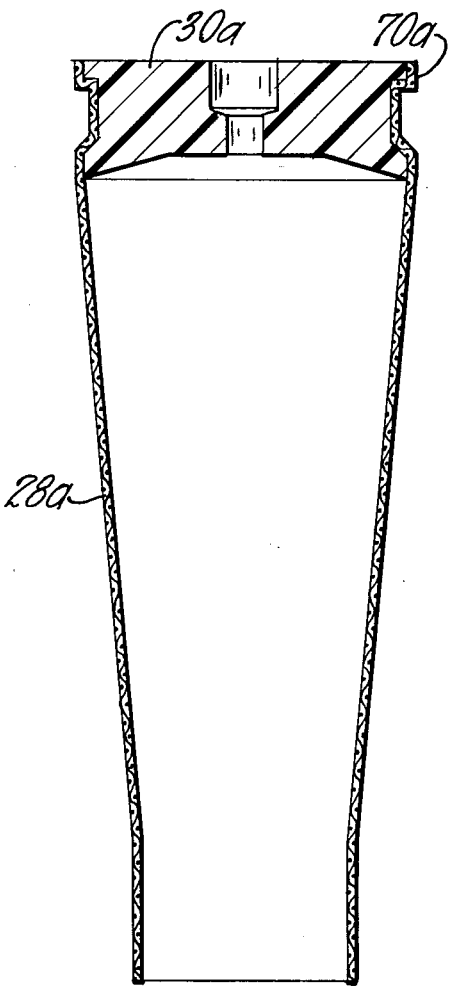
FIG. 4 is a sectional view of a preform for an composite cartridge case embodying principles of the present invention.
Figure 5:
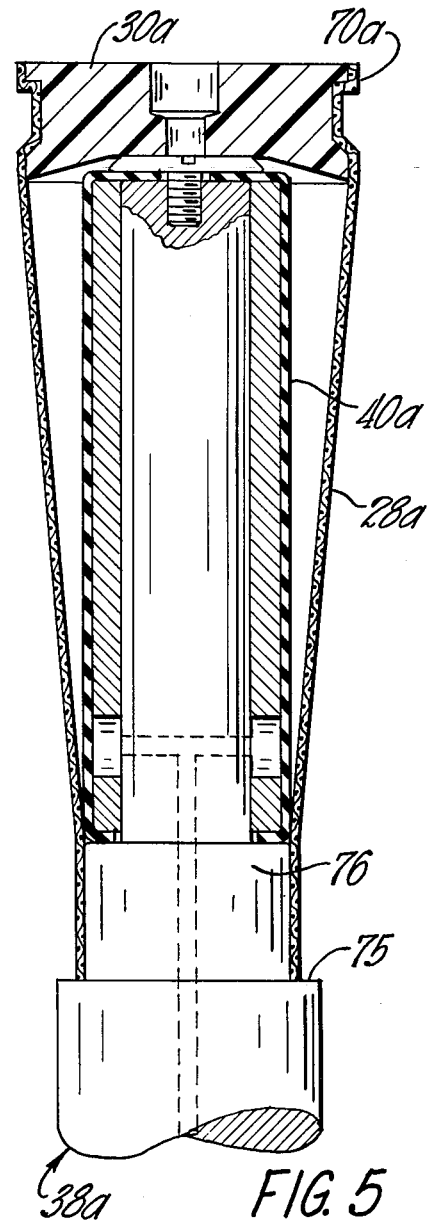
FIG. 5 shows the preform of FIG. 4 slipped over an inflatable bladder mechanism used in molding the preform of FIG. 4.
Figure 6:
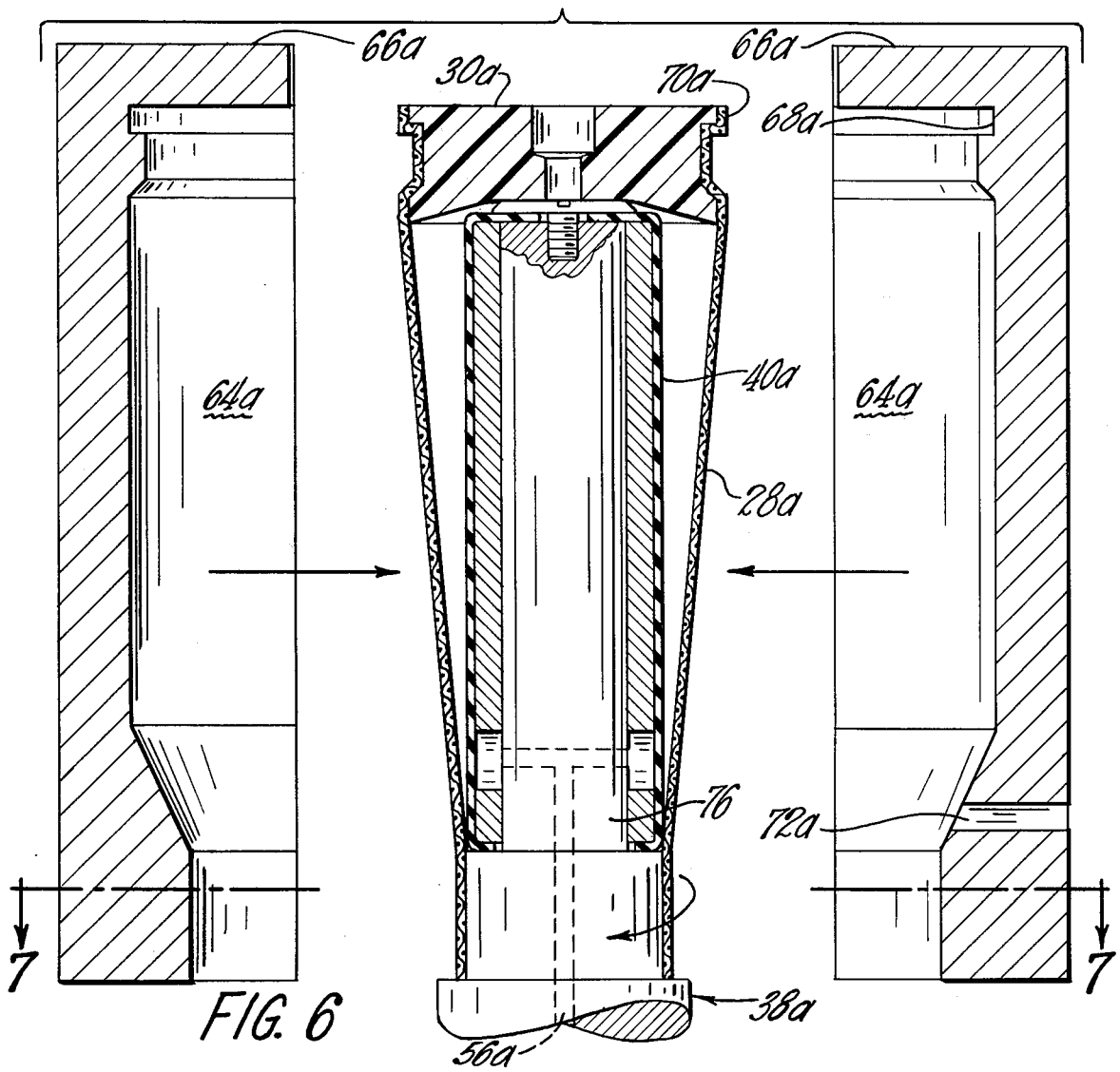
FIG. 6 is a longitudinal sectional view through molding apparatus similar to FIG. 3, but designed to mold the preform of FIG. 4.
Figure 7:
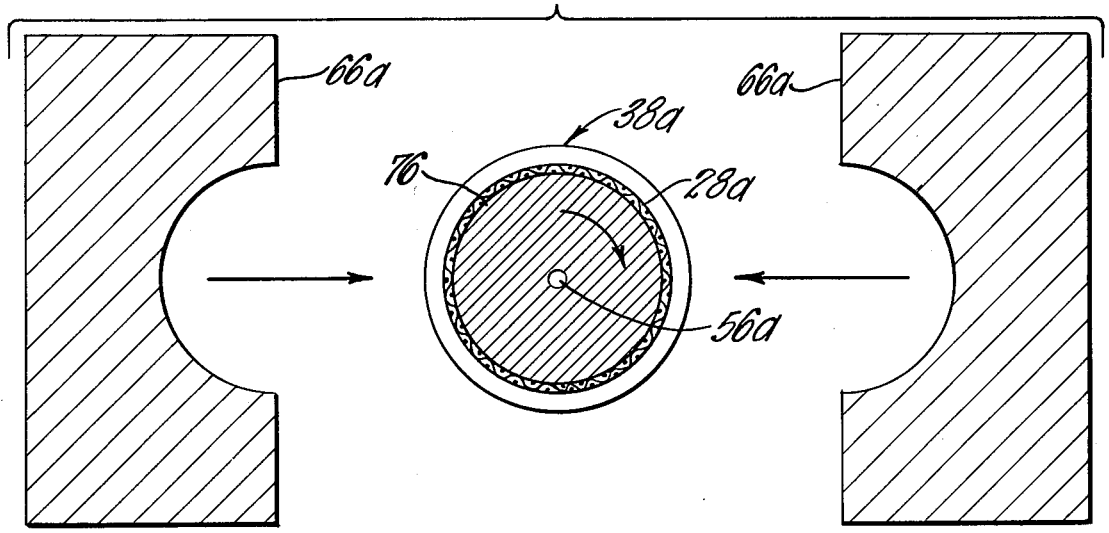
FIG. 7 is a sectional view taken approximately on the line 7—7 of FIG. 6.

The cartridge case 10 shown in FIGS. 1 through 3 includes a metal ring 12 at the primer end, and a metal thimble 14 at the projectile end. The metal ring 12 includes an annular groove 16 in its outer surface, this groove corresponding to the conventional groove for receiving the conventional ejection mechanism by which the cartridge is pulled from the gun. Ring 12 also comprises an inwardly projecting ridge 18 as later explained.

The thimble 14 has a conical portion 20 which tapers down powder chamber 22 to cylindrical section 24 for encasing the projectile, not shown. Cylindrical section 24 includes an inwardly projecting ring 26 for gripping and holding the projectile.

The sidewalls of the casing are reinforced by glass fiber sleeve 28, the rear end portion of which is surrounded by ring 12, and the forward portion of which surrounds metal thimble 14. The cartridge further includes annular glass fiber preform 30 having outer circumference 32 shaped to receive ring 12, and an axially extending opening 34 shaped to receive the primer cap. The glass fibers of the preform 30 are loosely compacted and bonded together by conventional bonding agents so that the fibers comprise approximately 20 percent of the total volume occupied by the preform, the preform being relatively stiff but resilient. Preform 30 is provided with annular groove 36 in its outer periphery, the groove being shaped to accomodate the inwardly projecting ridge 18 of ring 12. The first end of the glass fiber sleeve 28 is sandwiched between the periphery of the preform 30 and the metal ring 12.

FIG. 2 of the drawings shows ring 12, thimble 14, glass fiber sleeve 28, and the preform 30 in unassembled form. The sleeve 28 can be formed into the shape shown in FIG. 2, but preferably is made continuously as a uniform diameter sleeve that will assume the shape shown in FIG. 2 during the molding operation. Thimble 14 and preform 30 are slipped into their respective ends of sleeve 28, and metal ring 12 is slipped over the end of the sleeve 28 containing the preform 30. The preform 30 is adapted to receive the inwardly projecting ridge 18 of the ring 12, and to expand outwardly thereafter to force sleeve 28 into engagement with the surface of the ring 12 when ridge 18 is brought into engagement with annular groove 36.

With reference to FIG. 3, after assembly as previously described, the thimble end of the assembly is slipped down over the top of the spindle 38 and expandable boot 40. Expandable boot 40 and spindle 38 for supporting the boot, can be made in various ways. The outer end of spindle 38, as shown in the drawing, is provided with reduced diameter section 42 to form shoulder 44. Boot 40 is generally cylindrical with necked down ends having openings 46 and 48 therethrough just large enough to receive the reduced diameter portion 42 of the spindle 38. Boot 40 has a length equal to the length of the reduced diameter section 42. A sleeve 50 is positioned between the ends of the boot to bias the lower end against shoulder 48 and to support the upper end just outwardly of the upper end of the reduced diameter section 42. The upper end of the boot is drilled and tapped to receive a hold down screw 52, head 54 of which sandwiches the upper end of the boot against the upper end of sleeve 50. A seal is thereby provided between the spindle and each end of boot 40. Spindle 38 contains an axially extending cavity 56 which communicates with a cross bore 58. Suitable openings 60 are provided in sleeve 50 to provide communication of the cross bore with the inner wall of boot 40. Suitable means, not shown, are provided to introduce compressed air into the axially extending cavity 56 of the spindle to inflate the boot against sleeve 28 as will later be explained. A suitable snap ring 61 is provided in a groove in the spindle 38 at a suitable location for abutment by the thimble 14 when preform 30 sets upon head 54 of the hold down screw in the upper end of spindle 38. An expandable spring ring 62 is positioned in another groove in the spindle at such a location that spring ring 62 snaps over the inwardly deformed ridge of the thimble 14 and holds it against snap ring 61. Any upward pull on the glass fiber sleeve 28 is opposed by the expandable ring 62 which holds the thimble in place while the sleeve 28 is being positioned.

The assembly which is positioned on spindle 38 is impregnated with a suitable prepolymer by encasing the assembly within a suitably formed chamber 64 of a split mold 66. The two sections of split mold 66 are brought together with groove 68 of mold 66 in register with extraction flange 70 of metal ring 12. Air, at a pressure of approximately 50 psig, is introduced into the boot through the cavity 56 of spindle 38 to inflate boot 40 and bias the sleeve 28 against the surface of mold cavity 64. Thereafter, a hardenable resin in introduced through passageway 72 of mold 66. The hardenable resin flows around and impregnates sleeve 28 and, at the same time, forces air out vent passage 74 located in the top of the mold 66. The hardenable resin flows upwardly through preform 30, When the resin stands in the passage 74, further addition of resin is discontinued. The mold is kept closed for a period of time sufficient for the resin to harden and the mold is heated to a temperature suitable for curing the resin.

Any suitable resin can be employed. One is an epoxy bisphenol A-type resin used with an amine type catalyst, with the mold being heated to a temperature of approximately 350° F.

After the resin is cured, the air is bled from cavity 56, and the mold is opened to recover the finished casing. Moving the casing upwardly off of the top of the spindle.

FIGS. 4 through 9 of the drawings show the various stages of forming another preferred embodiment of the present invention which differs from the embodiment previously described in that the casing is made wholly of glass fiber reinforced plastic and does not have metal rings at its opposite ends. Those portions of the embodiment shown in FIGS. 4 through 9, which correspond to similar portions of the embodiment shown in FIGS. 1 through 3, are designated by a like reference numeral characterized further in that a subscript "a" is affixed thereto.

In the embodiment shown in FIGS. 4 through 9, there is no thimble 14. Spindle 38a is slightly larger in diameter than is spindle 38 and has a shoulder 75 positioned at the forward end of the cartridge, and the portion 76 positioned adjacent the shoulder 75, portion 76 having a diameter corresponding to the internal diameter of the thimble 14. In other features, spindle 38a corresponds to spindle 38.

Figure 8:
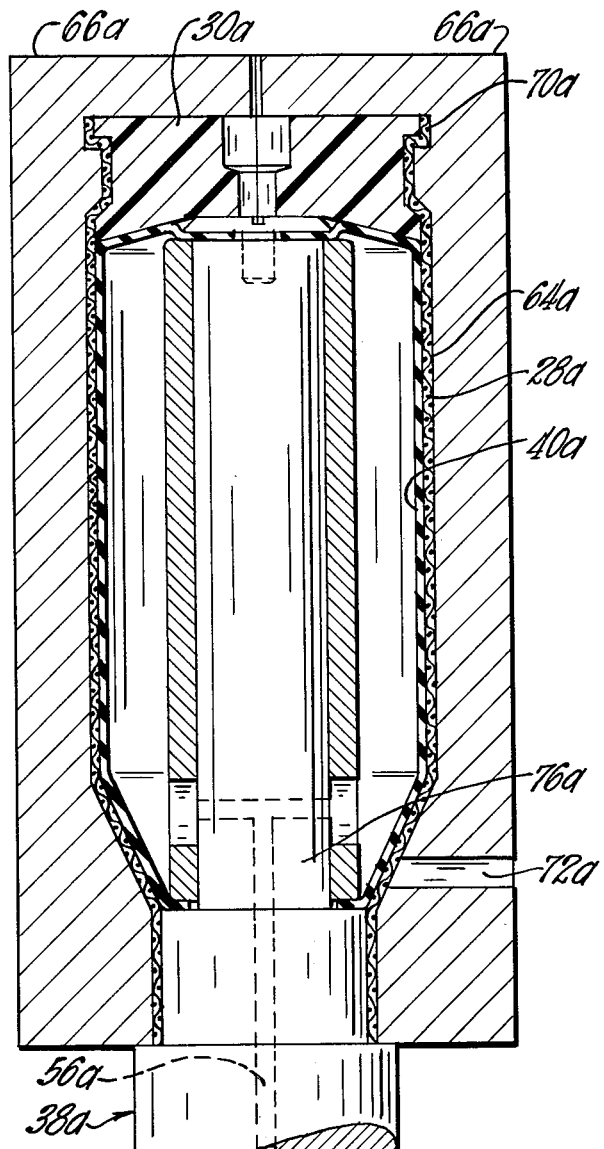
FIG. 8 is a longitudinal view showing the molding apparatus of FIG. 6 in its completely closed condition; and, FIG. 9 is a sectional view of the composite cartridge case of the present invention.

Fiber glass sleeve 28a is initially formed as a cylindrical tube of a diameter slightly less than that of preform 30a which, at its outer surface, has a configuration corresponding to that of ring 12. The upper end of sleeve 28a is expanded over preform 30a, and this assembly is then slipped over the upper portion of spindle 38a. *The lower end of sleeve 28a is pulled downwardly while fixing the upper end thereof to give a slightly conical taper to the sleeve.* Thereafter, split mold 66a is closed with groove 68a in register with the extraction flange 70a. When the two sections of the mold 66a are within approximately ⅛ inch of closing, spindle 38a is rotated approximately 90 degrees to pull any portion of sleeve 28a from the clearance between the half sections of the mold. Thereafter, air is admitted through the cavity 56a to expand sleeve 28a. Thereafter, the two sections of the mold are brought together into their mold forming position. Resin is then introduced into the mold through cavity 56a and the cavity is filled with resin to wet out the glass fiber sleeve 28a and preform 30a. FIG. 8 of the drawing shows the mold in the closed position in which this takes place.

Figure 9:
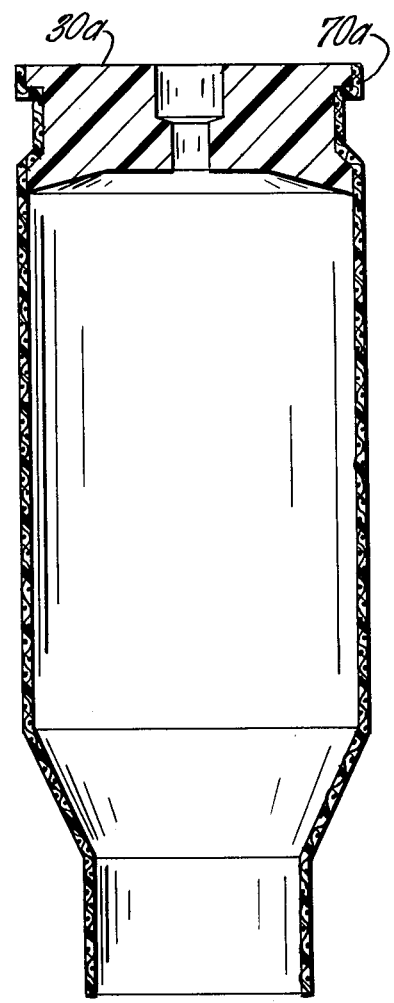

A curing cycle similar to that previously described can be utilized to harden the resin and form the cartridge. Thereafter, the mold is opened, boot 40a is deflated, and the cartridge shown in FIG. 9 is removed from the spindle. A post cure of the cartridge can be used. Any unnecessary flash is removed from the molded part to provide a plastic cartridge case that can be fitted with a primer, filled with powder, and have a projectile installed therein. If desired, instead of crimping the case against the end of the projectile, a soft waxy resin can be used to seal the projectile into the cartridge case.

While the invention has been described as utilizing a knitted or woven glass fiber sleeve as a reinforcement, it will be understood that any fiber reinforcement can be used. Because of strength and temperature considerations, however, glass fiber is the preferred material for making the reinforcement sleeves.

Any suitable hardenable resin can be used; as for example, epoxies, polyesters, polycarbonates, nylons and aldehyde-condensates resins. Mold release agents can be included in the resin prepolymers that are used to form the cartridge case, and that these mold release agents will provide a coating on the exterior of the cartridge case that will act as a further lubricant for preventing seizure between the plastic cartridge and the gun bore.

While the invention has been described in considerable detail, no limitation o the particular embodiments shown and described as intended; it is intended to increase all novel adaptations, modifications and arrangements thereof which come within the practice of those skilled in the art to which the invention relates, and which comes within the purview of the following claims.

What we claim is:

1. A method for making a casing comprising:
   (a) inserting a fibrous preform into a first end of a fibrous sleeve, said preform being configured to interlock said sleeve with an encircling preformed ring and without said ring form a head for said casing;
   (b) expanding an expandible core within said fibrous preform and said sleeve to expand said preform and said sleeve into said ring within a mold;
   (c) introducing hardenable resin between said expandible core and inner walls of said mold to impregnate said fibrous sleeve and said fibrous preform;
   (d) hardening said resin to form said casing; and removing said casing from said mold.

2. The method of claim 1 in which said fibrous preform is positioned within a ring and said sleeve is positioned between said fibrous preform and said ring.

3. The method of claim 2 in which said fibrous preform is adapted with a circumferential groove adapted to receive a projection on the inner surface of said ring.

4. In a method for making a tubular casing having a closed end, the steps comprising:
   (a) inserting a fibrous preform into a first end of a fibrous sleeve, said preform being configured to interlock said sleeve with an encircling preformed ring and with said ring form a head for said casing;
   (b) expanding said preform within said ring to interlock said sleeve with said ring.

5. The method of claim 4 including performing said expanding by inflating an expandible core within said sleeve and said preform.

6. The method of claim 4 including expanding a tubular member within an open end of said sleeve opposite said preform to reinforce said sleeve adjacent said open end.

7. The method of claim 4 including introducing a resin within said mold to impregnate said sleeve and said preform.

8. The method of claim 7 including hardening said resin to form said casing.

9. The method of claim 8 including expanding a tubular member within an open end of said sleeve opposite said preform to reinforce said sleeve adjacent said open end.

* * * * *

UNITED STATES PATENT AND TRADEMARK OFFICE
CERTIFICATE OF CORRECTION

PATENT NO. : 4,187,271
DATED : February 5, 1980
INVENTOR(S) : J. Albert Rolston and Thomas E. Philipps It is certified that error appears in the above-identified patent and that said Letters Patent are hereby corrected as shown below:

At Page 1, item [54], title should be: METHOD OF MAKING A CASING

In Column 1, line 2 should read: METHOD OF MAKING A CASING

*Signed and Sealed this*

*Thirtieth* Day of *December 1980*

[SEAL]

*Attest:*

SIDNEY A. DIAMOND

*Attesting Officer*  *Commissioner of Patents and Trademarks*